US012218858B2

(12) United States Patent
Wang et al.

(10) Patent No.: US 12,218,858 B2
(45) Date of Patent: Feb. 4, 2025

(54) DYNAMICALLY RECONFIGURABLE NETWORK SYSTEM AND NETWORK SCHEDULING METHOD FOR INTELLIGENT VEHICLE

(71) Applicant: SHENZHEN AUTOMOTIVE RESEARCH INSTITUTE, BEIJING INSTITUTE OF TECHNOLOGY (SHENZHEN RESEARCH INSTITUTE OF NATIONAL ENGINEERING LABORATORY FOR ELECTRIC VEHICLES), Guangdong (CN)

(72) Inventors: Wenwei Wang, Guangdong (CN); Wanke Cao, Guangdong (CN); Jinrui Nan, Guangdong (CN)

(73) Assignee: SHENZHEN AUTOMOTIVE RESEARCH INSTITUTE, BEIJING INSTITUTE OF TECHNOLOGY (SHENZHEN RESEARCH INSTITUTE OF NATIONAL ENGINEERING LABORATORY FOR ELECTRIC VEHICLES), Shenzhen (CN)

( * ) Notice: Subject to any disclaimer, the term of this patent is extended or adjusted under 35 U.S.C. 154(b) by 0 days.

(21) Appl. No.: 18/575,447

(22) PCT Filed: Dec. 28, 2021

(86) PCT No.: PCT/CN2021/141899
§ 371 (c)(1),
(2) Date: Dec. 29, 2023

(87) PCT Pub. No.: WO2023/019853
PCT Pub. Date: Feb. 23, 2023

(65) Prior Publication Data
US 2024/0333659 A1 Oct. 3, 2024

(30) Foreign Application Priority Data

Aug. 19, 2021 (CN) .......................... 202110952265.1

(51) Int. Cl.
*H04L 47/785* (2022.01)
*H04L 67/12* (2022.01)
*H04N 21/414* (2011.01)

(52) U.S. Cl.
CPC ............ *H04L 47/785* (2013.01); *H04L 67/12* (2013.01); *H04N 21/41422* (2013.01)

(58) Field of Classification Search
CPC .. H04L 47/785; H04L 67/12; H04N 21/41422
See application file for complete search history.

(56) References Cited

U.S. PATENT DOCUMENTS

2018/0293816 A1\* 10/2018 Garrett ................. G07C 5/0808
2019/0384522 A1 12/2019 Yun et al.
(Continued)

FOREIGN PATENT DOCUMENTS

| CN | 105599705 A | 5/2016 |
|----|-------------|--------|
| CN | 108891409 A | 11/2018 |

(Continued)

OTHER PUBLICATIONS

Yu Liu et al., A Study on the Optimization Algorithm for the Data Transmission Efficiency in Car Body CAN Bus, Automotive Engineering, 2009, pp. 621-623, vol. 31, No. 7.
(Continued)

*Primary Examiner* — Blake J Rubin

(57) ABSTRACT

A dynamically reconfigurable network system and network scheduling method for an intelligent vehicle, the system comprising a central computing unit, a chassis domain controller, an entertainment domain controller, an intelligent driving domain controller and a vehicle body domain controller. The central computing unit is separately connected to (Continued)

the chassis domain controller, the entertainment domain controller, the intelligent driving domain controller and the vehicle body domain controller by means of a network. The chassis domain controller, the entertainment domain controller, the intelligent driving domain controller and the vehicle body domain controller respectively comprise a plurality of intra-domain ECUs, and are respectively connected to the plurality of intra-domain ECUs by means of the network.

8 Claims, 7 Drawing Sheets

(56) References Cited

U.S. PATENT DOCUMENTS

| | | | | |
|---|---|---|---|---|
| 2019/0394089 | A1* | 12/2019 | Barrett | H04W 12/088 |
| 2020/0294401 | A1* | 9/2020 | Kerecsen | G08G 1/205 |
| 2020/0389338 | A1* | 12/2020 | Park | H04L 12/40 |
| 2021/0269050 | A1* | 9/2021 | Furuhashi | B60W 30/182 |
| 2021/0356279 | A1* | 11/2021 | Szigeti | G01C 21/3407 |
| 2022/0046114 | A1* | 2/2022 | Entelis | H04L 12/40 |
| 2022/0083052 | A1* | 3/2022 | Oyama | H04W 4/024 |
| 2022/0086021 | A1* | 3/2022 | Philippe | H04L 12/40169 |
| 2022/0321655 | A1* | 10/2022 | Mendez Rodriguez | G06F 9/5044 |
| 2023/0019817 | A1* | 1/2023 | Huang | H04L 63/0227 |
| 2024/0053738 | A1* | 2/2024 | Wang | B60W 50/0205 |
| 2024/0203170 | A1* | 6/2024 | Manabe | G07C 5/008 |

FOREIGN PATENT DOCUMENTS

| | | |
|---|---|---|
| CN | 108965437 A | 12/2018 |
| CN | 111976623 A | 11/2020 |
| CN | 112407104 A | 2/2021 |
| CN | 112706712 A | 4/2021 |
| CN | 113176771 A | 7/2021 |
| JP | 2017061278 A | 3/2017 |

OTHER PUBLICATIONS

Notice of Allowance of counterpart Chinese Patent Application No. 202110952265.1 issued on Oct. 12, 2021.

International Search Report of PCT Patent Application No. PCT/CN2021/141899 issued on Apr. 24, 2022.

* cited by examiner

| $Tri$ | $N_{A,3}$ | $N_{S,0}$ | $T_{Sample,1}$ | $T_{Sample,2}$ | $T_{Sample,3}$ | $T_{Sample,4}$ | trigger  standby  activated  sampling periods of domain controller 1, 2, 3, 4
information node    node

| $Tri$ | $N_{A,403}$ | $N_{S,301}$ | $T_{Sample,1}$ | $T_{Sample,2}$ | $T_{Sample,3}$ | $T_{Sample,4}$ | trigger   standby   activated   sampling periods of domain controller 1, 2, 3, 4
information  node      node

FIG. 7

DYNAMICALLY RECONFIGURABLE NETWORK SYSTEM AND NETWORK SCHEDULING METHOD FOR INTELLIGENT VEHICLE

TECHNICAL FIELD

The present disclosure relates to intelligent vehicles, in particular to a dynamically reconfigurable network system and a network scheduling method for an intelligent vehicle.

BACKGROUND

Intelligent vehicles have become a research hotspot in academia and a new driving force for the growth of the automotive industry. Intelligent vehicles integrate a number of high complexity technologies such as environmental perception, planning and decision-making, dynamic control and ergonomics, and also cutting-edge technologies in many fields such as operating systems, modern sensing, artificial intelligence and information communication. Intelligent vehicles have greatly improved the convenience of driving and have a significant promoting effect on improving road traffic safety and efficiency. The rapid development of automotive intelligence has further improved the electrification of vehicles, and more and more electronic and electrical components (such as cameras, radars, controllers, and car mechanics) are integrated into a vehicle network system to achieve diversified functions. However, the increasing number of electronic and electrical components has also significantly increased the amount of network information and further complicated the transmission path of network information, bringing great challenges to the real-time and stability of information transmission in the vehicle network system.

To address the above issues, a static network scheduling method can be adopted at present, with the same control parameters for all network load scenarios. However, there may still be some invalid electronic and electrical components occupying network resources in the vehicle network system obtained through this method, resulting in low utilization of network resources. Moreover, this method cannot adapt to changes in network load in time, making it difficult to balance the high utilization of network bandwidth and real-time network information under high and low loads.

SUMMARY

Technical Problem

Dynamically reconfigurable network systems and network scheduling methods for intelligent vehicles provided in embodiments of the present disclosure are aimed to improve utilization of network resources and bandwidth and ensure real-time transmission of information.

Solution of the Problem

Technical Solution

In accordance with a first aspect, a dynamically reconfigurable network system of an intelligent vehicle provided in an embodiment may include: a central computing unit, a chassis domain controller for controlling a chassis system of the vehicle, an entertainment domain controller for controlling a multimedia entertainment system of the vehicle, an intelligent driving domain controller for controlling an automatic driving system of the vehicle, and a vehicle body domain controller for controlling a vehicle body electronic system of the vehicle; wherein, the central computing unit may be coupled to the chassis domain controller, the entertainment domain controller, the intelligent driving domain controller and the vehicle body domain controller respectively through a network, the chassis domain controller, the entertainment domain controller, the intelligent driving domain controller and the vehicle body domain controller each may comprise a plurality of intra-domain ECUs (electronic control units) and each may connect to the plurality of intra-domain ECUs through a network;

the central computing unit may be configured to obtain information about driver operating instructions and information about vehicle operating condition, determine information about central scheduling instructions based on the information about driver operating instructions and the information about vehicle operating condition, and transmit the information about central scheduling instructions to the chassis domain controller, the entertainment domain controller, the intelligent driving domain controller and the vehicle body domain controller, wherein the information about central scheduling instructions may comprise: domain controller triggering information, node control information involving a domain controller that needs to be activated or standby and/or an ECU that needs to be activated or standby, and domain controller periodic information;

the chassis domain controller, the entertainment domain controller, the intelligent driving domain controller and the vehicle body domain controller may be configured to receive and parse the information about central scheduling instructions, and update an operating state of their own domain controller and an operating state of each connected intra-domain ECU based on the node control information, the operating state may include an activated state and a standby state; the chassis domain controller, the entertainment domain controller, the intelligent driving domain controller, or the vehicle body domain controller in the activated state may be configured to determine information about intra-domain comprehensive control instructions based on the domain controller periodic information, the information about vehicle operating condition and information about state of electronic and electrical components connected with each intra-domain ECU, and transmit the information about intra-domain comprehensive control instructions to each connected intra-domain ECU, wherein the information about intra-domain comprehensive control instructions may comprise the information about central scheduling instructions, a baud rate value of sending information to each intra-domain ECU, and a control instruction for each intra-domain ECU; and each intra-domain ECU in the activated state may be configured to receive the information about intra-domain comprehensive control instructions, and control the connected electronic and electrical components based on the information about intra-domain comprehensive control instructions.

In accordance with a second aspect, a network scheduling method provided in an embodiment may be applied to the dynamically reconfigurable network system of an intelligent vehicle provided in the first aspect. The method may comprise:

the central computing unit obtaining the information about driver operating instructions and the information about vehicle operating condition, determining information about the central scheduling instructions based on the information about driver operating instructions and the information about vehicle operating condition, and transmitting the information about central scheduling instructions to the chassis domain controller, the entertainment domain controller, the intelligent driving domain controller and the vehicle body domain controller, wherein the information about central scheduling instructions includes: domain controller triggering information, node control information involving a domain controller that needs to be activated or standby and/or an intra-domain ECU that needs to be activated or standby, and domain controller periodic information;

the chassis domain controller, the entertainment domain controller, the intelligent driving domain controller and the vehicle body domain controller receiving and parsing the information about central scheduling instructions, updating the operating state of their own domain controllers and the operating state of each connected intra-domain ECU based on the node control information, the operating state including the activated state and the standby state; the chassis domain controller, the entertainment domain controller, the intelligent driving domain controller or the vehicle body domain controller in the activated state determining the information about intra-domain comprehensive control instructions based on the domain controller periodic information, the information about vehicle operating condition and the information about state of electronic and electrical components connected with each intra-domain ECU, and transmitting the information about intra-domain comprehensive control instructions to each connected intra-domain ECU, wherein the information about intra-domain comprehensive control instructions includes the information about central scheduling instructions, the baud rate value of sending information to each intra-domain ECU, and the control instruction for each intra-domain ECU; and each intra-domain ECU in the activated state receiving the information about intra-domain comprehensive control instructions, and controlling the connected electronic and electrical components based on the information about intra-domain comprehensive control instructions.

Optionally, the domain controller triggering information may comprise a basic period for planning network scheduling of the intelligent vehicle, the basic period includes a triggering time period, a node control time period, an asynchronous time period, an idle time period and a synchronous time period; the chassis domain controller, the entertainment domain controller, the intelligent driving domain controller and the vehicle body domain controller may read their respective corresponding domain controller periodic information during the triggering time period, randomly communicate based on event triggering during the asynchronous time period, perform no communication during the idle time period, and periodically communicate with each connected intra-domain controller ECU based on their respective domain controller periodic information during the synchronous time period.

Optionally, determining information about the central scheduling instructions based on the information about driver operating instructions and the information about vehicle operating condition may comprise:

determining the domain controller triggering information based on the a velocity, acceleration and yaw angular velocity of the vehicle and network traffic and network capacity entering and exiting the central computing unit during a previous basic period;

determining the node control information based on the information about driver operating instructions and a predetermined node control rule;

determining the domain controller periodic information corresponding to the chassis domain controller, the entertainment domain controller, the intelligent driving domain controller and the vehicle body domain controller, respectively, based on the velocity, acceleration and yaw angular velocity of the vehicle, the network traffic and the network capacity entering and exiting the central computing unit during a previous basic period, and the numbers of event triggering information and periodic information entering and exiting the chassis domain controller, the entertainment domain controller, the intelligent driving domain controller and the vehicle body domain controller during a previous sampling period; and obtaining the information about central scheduling instructions by packaging the domain controller triggering information, the node control information, and the domain controller periodic information of each domain controller.

Optionally, the chassis domain controller, the entertainment domain controller, the intelligent driving domain controller or the vehicle body domain controller in the activated state determining the information about intra-domain comprehensive control instructions based on the domain controller periodic information, the information about vehicle operating condition and the information about state of electronic and electrical components connected with each intra-domain ECU may comprise:

based on the numbers of event triggering information and periodic information entering and exiting the chassis domain controller, the entertainment domain controller, the intelligent driving domain controller and the vehicle body domain controller during a previous sampling period and the domain controller periodic information respectively corresponding to the chassis domain controller, the entertainment domain controller, the intelligent driving domain controller and the vehicle body domain controller, obtaining baud rate values of sending information by the chassis domain controller, the entertainment domain controller, the intelligent driving domain controller and the vehicle body domain controller to their respective connected intra-domain ECU;

the chassis domain controller, the entertainment domain controller, the intelligent driving domain controller or the vehicle body domain controller in the activated state, during respective corresponding sampling periods of their domain controllers, obtaining information about state of electronic and electrical components connected with each intra-domain ECU, and, based on the information about state of electronic and electrical components connected with each intra-domain ECU and the information about vehicle operating condition, determining control instruction for each connected intra-domain ECU; and packaging the information about central scheduling instructions, the baud rate value of sending information to each connected intra-domain ECU, and the control instruction for each connected intra-domain ECU to obtain the information about intra-domain comprehensive control instructions.

Optionally, transmitting the information about central scheduling instructions to the chassis domain controller, the entertainment domain controller, the intelligent driving domain controller and the vehicle body domain controller may comprise:

broadcasting the information about central scheduling instructions to the chassis domain controller, the entertainment domain controller, the intelligent driving domain controller and the vehicle body domain controller.

Optionally, transmitting the information about intra-domain comprehensive control instructions to each connected intra-domain ECU may comprise:

broadcasting the information about intra-domain comprehensive control instructions to each connected intra-domain ECU.

Optionally, when the node control information involves a domain controller that needs to be standby, updating an operating state of their own domain controller and an operating state of each connected intra-domain ECU based on the node control information may comprise:

updating the operating state of a domain controller that needs to be standby and that of each intra-domain ECU connected to the domain controller that needs to be standby to the standby state.

In accordance with a third aspect, an intelligent vehicle provided in an embodiment may include the dynamically reconfigurable network system of an intelligent vehicle according to the first aspect, a memory for storing a program, a processor for executing the program stored in the memory to implement the method according to any one of the second aspect.

In accordance with a fourth aspect, a computer-readable storage medium provided in an embodiment may store a program which is executed by a processor to implement the method according to any one of the second aspect.

Beneficial Effect of the Invention

Beneficial Effect

A dynamically reconfigurable network system and a network scheduling method for an intelligent vehicle are provided in an embodiment of the present disclosure. The system may include a central computing unit, a chassis domain controller, an entertainment domain controller, an intelligent driving domain controller and a vehicle body domain controller. The central computing unit may be connected to the chassis domain controller, the entertainment domain controller, the intelligent driving domain controller and the vehicle body domain controller respectively through a network. The chassis domain controller, the entertainment domain controller, the intelligent driving domain controller and the vehicle body domain controller each may comprise a plurality of intra-domain ECUs (electronic control units), and each may connect to the plurality of intra-domain ECUs respectively through a network. The chassis domain controller may be configured to control the chassis system of the vehicle; the entertainment domain controller may be configured to control the multimedia entertainment system of the vehicle; the intelligent driving domain controller may be configured to control the automatic driving system of the vehicle; the vehicle body domain controller may be configured to control the vehicle body electronic system of the vehicle; the central computing unit may be configured to obtain the information about driver operating instructions and the information about vehicle operating condition, determine the information about central scheduling instructions based on the information about driver operating instructions and the information about vehicle operating condition, and sent the information about central scheduling instructions to the chassis domain controller, the entertainment domain controller, the intelligent driving domain controller and the vehicle body domain controller. The information about central scheduling instructions may include: domain controller triggering information, node control information involving a domain controller that needs to be activated or standby and/or an ECU that needs to be activated or standby, and domain controller periodic information. The chassis domain controller, the entertainment domain controller, the intelligent driving domain controller and the vehicle body domain controller may be configured to receive and parse the information about central scheduling instructions, and update the operating state of their own domain controllers and the operating state of each connected intra-domain ECU based on the node control information, wherein the operating state may include an activated state and a standby state. The chassis domain controller, the entertainment domain controller, the intelligent driving domain controller or the vehicle body domain controller in the activated state may, based on the domain controller periodic information, the information about vehicle operating condition and the information about the state of electronic and electrical components connected to each intra-domain ECU, determine the information about intra-domain comprehensive control instructions, and transmit the information about intra-domain comprehensive control instructions to each connected intra-domain ECU. The information about intra-domain comprehensive control instructions may include the information about central scheduling instructions, the baud rate value of sending information to each intra-domain ECU, and control instructions for each intra-domain ECU. Each intra-domain ECU in the activated state may be configured to receive the information about intra-domain comprehensive control instructions, and control the connected electronic and electrical components based on the information about intra-domain comprehensive control instructions. By means of dynamically activating or placing network nodes in the network system on standby based on a driver's wishes and the vehicle's running condition, the vehicle network topology is changed in real time, thus preventing the waste of network resources caused by invalid information transmission from a source, thereby increasing the utilization rate of the network resources. Furthermore, the nodes in the activated state in the network system change dynamically, causing the amount of data transmitted in the network system to also dynamically change. With the network scheduling method disclosed herein, according to the running condition of the vehicle and the transmission situation of network information in the network system, a basic period of the reconfigurable network scheduling, a sampling period of the domain controllers and the baud rate of intra-domain information transmission are dynamically changed, thereby achieving the real-time performance of network messages and high utilization of network bandwidth under all operating conditions of the intelligent vehicle.

BRIEF DESCRIPTION OF THE DRAWINGS

FIG. 7 is a schematically structural diagram of a central scheduling command according to another embodiment of the present disclosure.

DETAILED DESCRIPTION

Figure 1:
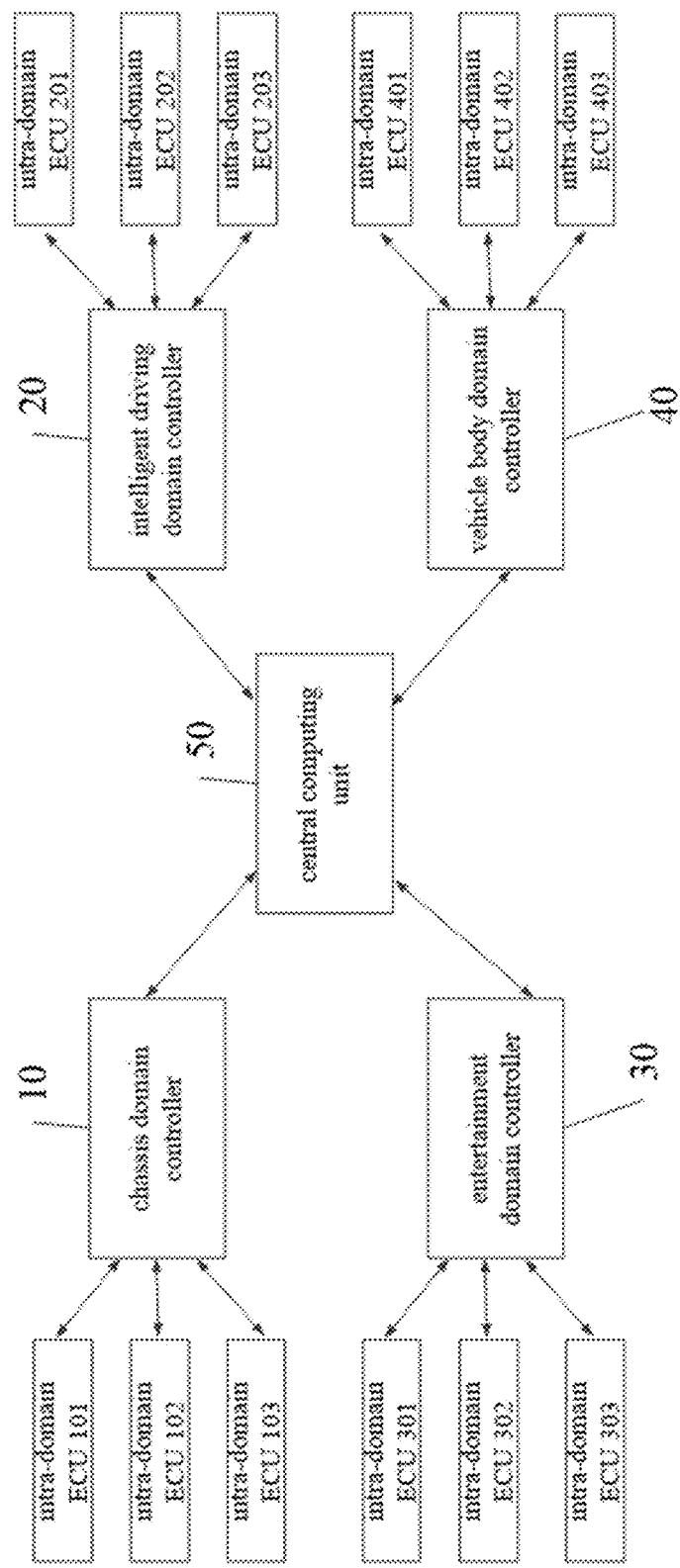
FIG. 1 is a schematically structural diagram of a dynamically reconfigurable network system of an intelligent vehicle according to a first embodiment of the present disclosure.

The present disclosure will be further described in detail below through specific embodiments with reference to the accompanying drawings. Common or similar elements are referenced with like or identical reference numerals in different embodiments. Many details described in the following embodiments are for the purpose of better understanding the present disclosure. However, those skilled in the art can realize with minimal effort that some of these features can be omitted in different cases or be replaced by other elements, materials and methods. For clarity some operations related to the present disclosure are not shown or illustrated herein so as to prevent the core from being overwhelmed by excessive descriptions. For those skilled in the art, such operations are not necessary to be explained in detail, and they can fully understand the related operations according to the description in the specification and the general technical knowledge in the field.

In addition, the features, operations or characteristics described in the specification may be combined in any suitable manner to form various embodiments. At the same time, the steps or actions in the described method can also be sequentially changed or adjusted in a manner that can be apparent to those skilled in the art. Therefore, the various sequences in the specification and the drawings are only for the purpose of describing a particular embodiment, and are not intended to be an order of necessity, unless otherwise stated one of the sequences must be followed.

The serial numbers of components herein, such as "first", "second", etc., are only used to distinguish the described objects and do not have any order or technical meaning. The terms "connect" and "couple" mentioned herein, unless otherwise specified, include both direct and indirect connections (coupling).

A dynamically reconfigurable network system and a network scheduling method for intelligent vehicles provided in an embodiment of the present disclosure are aimed to improve utilization of network resources and bandwidth and ensure real-time transmission of information, which are described in detail below.

FIG. 1 is a schematically structural diagram of a dynamically reconfigurable network system for an intelligent vehicle according to an embodiment of the present disclosure. As shown in FIG. 1, the system may include a chassis domain controller 10, an intelligent driving domain controller 20, an entertainment domain controller 30, a vehicle body domain controller 40 and a central computing unit 50. The central computing unit 50 may be connected to the chassis domain controller 10, the intelligent driving domain controller 20, the entertainment domain controller 30 and the vehicle body domain controller 40 respectively through a network. The chassis domain controller 10, the intelligent driving domain controller 20, the entertainment domain controller 30 and the vehicle body domain controller 40 may each include a plurality of intra-domain electronic control units (ECUs), and may each connect to the plurality of intra-domain ECUs respectively via a network. For example, in FIG. 1, the chassis domain controller 10 may be connected to an intra-domain ECU 101, an intra-domain ECU 102 and an intra-domain ECU 103 via a network; the intelligent driving domain controller 20 may be connected to an intra-domain ECU 201, an intra-domain ECU 202 and an intra-domain ECU 203 via a network; the entertainment domain controller 30 may be connected to an intra-domain ECU 301, an intra-domain ECU 302 and an intra-domain ECU 303 via a network; and the vehicle body domain controller 40 may be connected to an intra-domain ECU 401, an intra-domain ECU 402 and an intra-domain ECU 403 via a network. The chassis domain controller 10 may be configured to control the chassis system of the vehicle; the intelligent driving domain controller 20 may be configured to control the automatic driving system of the vehicle; the entertainment domain controller 30 may be configured to control the multimedia entertainment system of the vehicle; and the vehicle body domain controller 40 may be configured to control the vehicle body electronic system of the vehicle.

The central computing unit 50 may be configured to obtain information about driver operating instructions and information about vehicle operating condition, determine information about central scheduling instructions based on the information about driver operating instructions and the information about vehicle operating condition, and transmit the information about central scheduling instructions to the chassis domain controller 10, the entertainment domain controller 30, the intelligent driving domain controller 20 and the vehicle body domain controller 40. The information about central scheduling instructions may include: domain controller triggering information, node control information, and domain controller periodic information. The node control information may involve a domain controller that needs to be activated or standby and/or an ECU that needs to be activated or standby.

The chassis domain controller 10, the entertainment domain controller 30, the intelligent driving domain controller 20 and the vehicle body domain controller 40 may be configured to receive and parse the information about central scheduling instructions, and update the operating state of their own domain controllers and the operating state of each connected intra-domain ECU based on the node control information. The operating state may include an activated state and a standby state. The chassis domain controller 10, the entertainment domain controller 30, the intelligent driving domain controller 20 or the vehicle body domain controller 40 in the activated state may, according to the domain controller periodic information, the information about vehicle operating condition and the information about the state of the electronic and electrical components connected to each intra-domain ECU, determine information about intra-domain comprehensive control instructions, and transmit the information about intra-domain comprehensive control instructions to each connected intra-domain ECU. The information about intra-domain comprehensive control instructions may include information about central scheduling instructions, the baud rate value of sending information to each intra-domain ECU, and control instructions for each intra-domain ECU.

Each intra-domain ECU in the activated state may be configured to receive the information about intra-domain comprehensive control instructions, and control connected electronic and electrical components based on the information about intra-domain comprehensive control instructions.

With the dynamically reconfigurable network system for an intelligent vehicle provided in an embodiment of the present disclosure, by means of dynamically activating or placing network nodes in the network system on standby based on a driver's wishes and the vehicle's running condition, the vehicle network topology is changed in real time, thus preventing the waste of network resources caused by invalid information transmission from a source, thereby increasing the utilization rate of the network resources. Furthermore, the nodes in the activated state in the network system change dynamically, causing the amount of data transmitted in the network system to also dynamically change. With the network scheduling method disclosed herein, according to the running condition of the vehicle and the transmission situation of network information in the network system, a basic period of the reconfigurable network scheduling, a sampling period of the domain controllers and the baud rate of intra-domain information transmission are dynamically changed, thereby achieving the real-time performance of network messages and high utilization of network bandwidth under all operating conditions of the intelligent vehicle.

Figure 2:
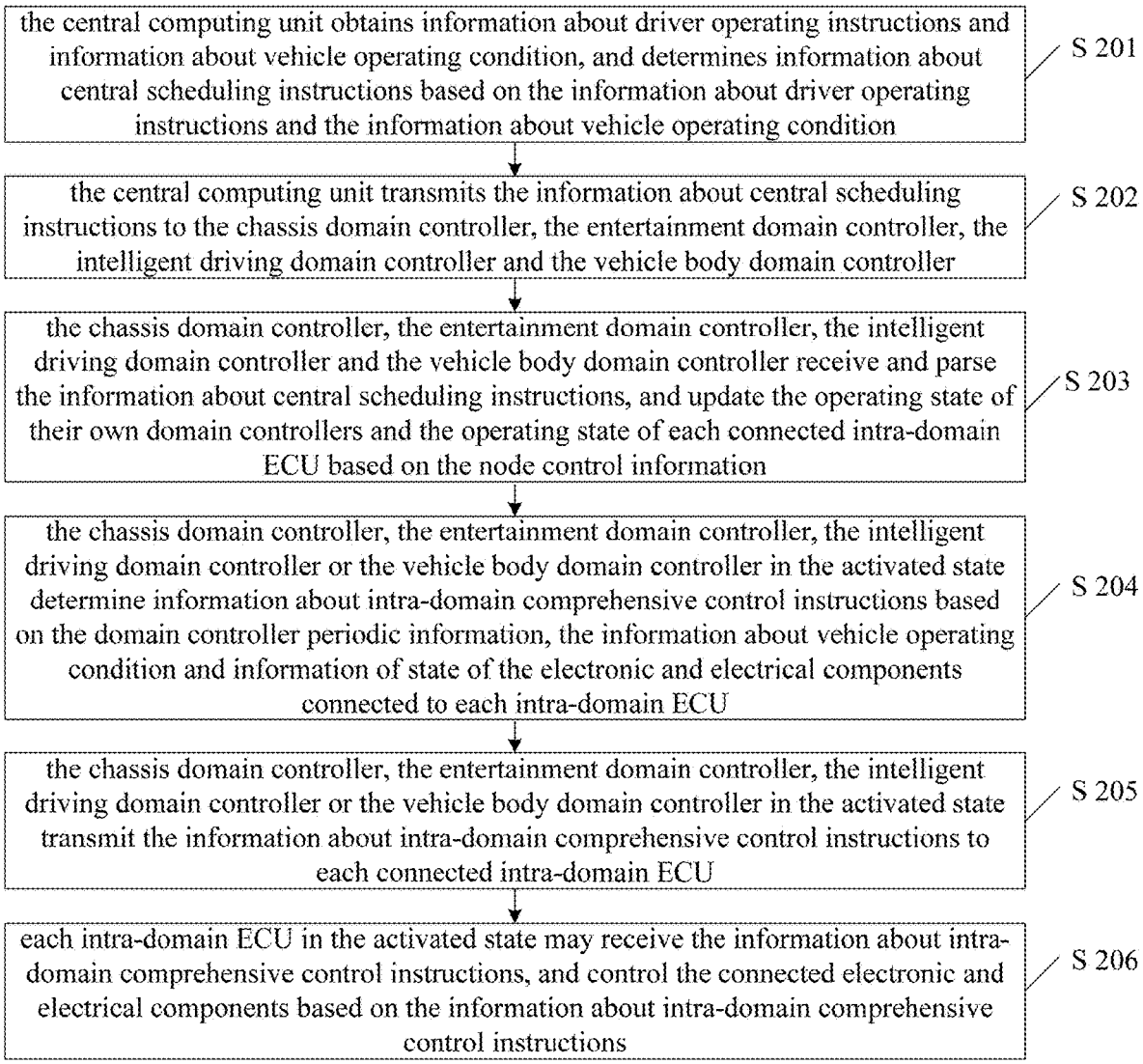
FIG. 2 is a schematic flowchart of a network scheduling method according to an embodiment of the present disclosure.

FIG. 2 is a schematic flowchart of a network scheduling method provided in an embodiment of the present disclosure. The method is applied to the dynamically reconfigurable network system for an intelligent vehicle provided in an embodiment of the present disclosure. As shown in FIG. 2, the network scheduling method in this embodiment may include the following steps Step 201: the central computing unit may obtain information about driver operating instructions and information about vehicle operating condition, and determine information about central scheduling instructions based on the information about driver operating instructions and the information about vehicle operating condition.

The central computing unit may receive the information about vehicle operating condition collected by various sensors and operating instructions issued by the driver (such as turning on automatic driving mode, turning off an entertainment device) in real time, and calculate the information about central scheduling instructions suitable for the current running condition of the vehicle and the driver's wishes based on the obtained information about driver operating instructions and information about vehicle operating condition.

The information about central scheduling instructions may comprise domain controller triggering information, the node control information, and the domain controller periodic information. Specifically, the domain controller triggering information is used to dynamically plan the basic period $T_{Basic}$ for reconfigurable network scheduling of the intelligent vehicle. The basic period may be composed of a time interval between two adjacent trigger information sent by the central computing unit. The basic period may be sequentially divided into a triggering time period $T_{Tri}$, a node control time period $T_{NT}$, an asynchronous time period $T_{AT}$, an idle time period $T_{FT}$ and a synchronous time period $T_{ST}$.

Specifically, the basic period $T_{Basic}$ can be calculated from a formula $T_{Basic}=F(v,a,\omega,f_c,c_c)$, where v, a and ω represent the velocity, acceleration and yaw angular velocity, respectively, $f_c$ and $c_c$ represent the network traffic and network capacity entering and exiting the central computing unit in a previous basic period.

The domain controller periodic information may be used to dynamically plan the sampling period $T_{sample}$ of each domain controller. Specifically, the sampling period of the domain controller numbered i can be calculated by a formula $T_{sample,i}=G(v,a,\omega,f_i,c_i,n_{A,i},n_{T,i})$, where $T_{sample,i}$ represents the sampling period of the domain controller numbered i, v, a and ω represent the velocity, acceleration and yaw angular velocity of the vehicle respectively, $f_i$ and $c_i$ represent the network traffic and network capacity entering and exiting the domain controller numbered i in a previous sampling period, and $n_{A,i}$ and $n_{T,i}$ represent the numbers of event triggering information and periodic information entering and exiting the domain controller numbered i in a previous sampling period. For example, the domain controller numbered 1 may be the chassis domain controller, the domain controller numbered 2 may be the intelligent driving domain controller, the domain controller numbered 3 may be the entertainment domain controller, and the domain controller numbered 4 may be the vehicle body domain controller.

The node control information may be used to dynamically plan network system topology. Specifically, the node control information may be determined based on the information about driver operating instructions and a predetermined node control rule. The node control information may involve a domain controller that needs to be activated or standby and/or an intra-domain ECU that needs to be activated or standby.

The central computing unit may package the calculated domain controller triggering information, the node control information, and the domain controller periodic information of each domain controller to obtain the information about central scheduling instructions.

Step 202: the central computing unit may transmit the information about central scheduling instructions to the chassis domain controller, the entertainment domain controller, the intelligent driving domain controller and the vehicle body domain controller.

Specifically, the central computing unit may broadcast the information about central scheduling instructions to the chassis domain controller, the entertainment domain controller, the intelligent driving domain controller and the vehicle body domain controller.

Step 203: the chassis domain controller, the entertainment domain controller, the intelligent driving domain controller and the vehicle body domain controller may receive and parse the information about central scheduling instructions, and update the operating state of their own domain controllers and the operating state of each connected intra-domain ECU based on the node control information.

The operating state may include the activated state and the standby state. The activated state may refer to a domain controller or an intra-domain ECU holding transmission and calculation of information; and the standby state may refer to a domain controller or an intra-domain ECU holding a standby mode with low power consumption and without transmission and calculation of information.

The chassis domain controller, the entertainment domain controller, the intelligent driving domain controller and the vehicle body domain controller may receive the information about central scheduling instructions within the triggering time period $T_{Tri}$, and read triggering information thereof. Then, each domain controller may read the node control information during the node control time period $T_{NT}$. For example, the node control information may include the numbering $N_{s,j}$ (j=0, 1, 2, 3, 4; 101, 102, 103 ..., 201, 202, 203 ..., 301, 302, 303 ..., 401, 402, 403 ..., where 0 represents no node that needs to be activated at this time, one digit other than 0 represents the numbering of a domain controller, and three digits represent the numbering of the intra-domain ECU) of the domain controller(s) and the intra-domain ECU(s) that need to be activated and the numbering $N_{A,k}$ (k=0, 1, 2, 3, 4; 101, 102, 103 ... ; 201, 202, 203 ... ; 301, 302, 303 ... ; 401, 402, 403 ... , where 0 represents no node that needs to be standby at this time, one digit other than 0 represents the numbering of a domain controller, and three digits represent the numbering of the intra-domain ECU) of the domain controller(s) and the intra-domain ECU(s) that need to be standby. Each domain controller may compare the numbering during the node control time period $T_{NT}$ to complete the transition of the domain controller(s) and intra-domain ECU(s) between the activated state and the standby state, thereby achieving dynamic changes in the network system topology of the intelligent vehicle. Each domain controller may also communicate randomly based on event triggering during the asynchronous time period $T_{AT}$, perform no communication during the idle time period $T_FT$, and periodically communicate with $T_{sample}$ as the sampling period based on the read domain controller periodic information that matches itself during the synchronous time period $T_{ST}$.

In an implementable embodiment, when the node control information involves a domain controller that needs to be standby, the domain controller, after receiving the node control information, may transmit a standby instruction to each intra-domain ECU connected to the domain controller to update the operating state of each intra-domain ECU to standby, and update its own operating state to standby.

Step 204: the chassis domain controller, the entertainment domain controller, the intelligent driving domain controller or the vehicle body domain controller in the activated state may determine information about intra-domain comprehensive control instructions based on the domain controller periodic information, the information about vehicle operating condition and information of state of the electronic and electrical components connected to each intra-domain ECU.

The information about intra-domain comprehensive control instructions may include the information about central scheduling instructions, the baud rate value of sending information to each intra-domain ECU, and control instructions for each intra-domain ECU.

Specifically, the baud rate of the domain controller numbered i may be obtained with a formula $B_i = H(n_{A,i}, n_{T,i}, T_{Sample,i})$, where $B_i$ represents the baud rate of the domain controller numbered i, $n_{A,i}$ and $n_{T,i}$ represent the numbers of the event triggering information and the periodic information entering and exiting the domain controller numbered i in a previous sampling period, respectively, and $T_{sample,i}$ represents the sampling period of the domain controller numbered i.

Specifically, the control instructions for each intra-domain ECU by the chassis domain controller, the entertainment domain controller, the intelligent driving domain controller or the vehicle body domain controller in the activated state may be obtained by the following ways: the chassis domain controller, the entertainment domain controller, the intelligent driving domain controller or the vehicle body domain controller in the activated state, during their respectively corresponding sampling period, obtaining information about states of the electronic and electrical components connected to each intra-domain ECU, and determining the control instructions for each connected intra-domain ECU according to the information about states of the electronic and electrical components connected to each intra-domain ECU and the information about vehicle operating condition.

After the chassis domain controller, the entertainment domain controller, the intelligent driving domain controller or the vehicle body domain controller in the activated state package the information about central scheduling instructions, the baud rate value of sending information to each connected intra-domain ECU and the control instructions for each connected intra-domain ECU respectively, information about intra-domain comprehensive control instructions can be obtained respectively.

Step 205: the chassis domain controller, the entertainment domain controller, the intelligent driving domain controller or the vehicle body domain controller in the activated state may transmit the information about intra-domain comprehensive control instructions to each connected intra-domain ECU.

When implemented, the chassis domain controller, the entertainment domain controller, the intelligent driving domain controller or the vehicle body domain controller in the activated state may broadcast the information about intra-domain comprehensive control instructions to each connected intra-domain ECU.

Step 206: each intra-domain ECU in the activated state may receive the information about intra-domain comprehensive control instructions, and control the connected electronic and electrical components based on the information about intra-domain comprehensive control instructions.

During the operation of an intelligent vehicle, there is no need for all electronic and electrical components in its network system, i.e. network nodes, to be in the operating state continuously. For example, when the intelligent vehicle is in a driver's driving state, there is unnecessary for components such as a front camera, a LiDAR, a side camera, a reverse radar, and rear camera to provide functions. If these components remain in operation, they will continuously transmit a large amount of data to the network system, occupying network resources, and further affecting the transmission of other network information. During driving, the vehicle may repeatedly turn on and off devices such as an entertainment media device, air conditioning and a ventilation device. If information about sampling and control of these components continue to occupy the network, it will also cause network congestion. In addition, when the driving conditions of the vehicle are different, its real-time requirements for the control system are different; for example, a rapid response of the control system can better ensure the safety of driving for accelerating, steering, and lane changing, while the real-time requirements of the control system are relatively lower for conditions such as low-speed straight driving. With the network scheduling method provided by one embodiment of the present disclosure, some network nodes in the network system may be dynamically activated or standby based on the driver's wishes and the vehicle's running condition, changing the network topology of the vehicle in real time and avoiding the waste of network resources caused by the transmission of invalid information from the source, thus improving the utilization of network resources. In addition, the nodes in the activated state in the network system change dynamically, causing the amount of data transmitted in the network system to also dynamically change. With the network scheduling method proposed in the present disclosure, the basic period of the reconfigurable network scheduling, the sampling period of the domain controller and the baud rate of the intra-domain information transmission can be changed dynamically according to the running condition of the vehicle and the transmission situation of network information in the network system, achieving real-time network messages and high utilization of network bandwidth for the intelligent vehicle under all operating conditions of the intelligent vehicle.

The following two specific implementation examples are used to illustrate the network scheduling method provided by the embodiments of the present disclosure, which adjusts the information transmission mode in real time based on changes in driving conditions, so as to meet the real-time information and high utilization of network bandwidth under various working conditions.

A first example is as follows:

An intelligent vehicle may need to complete a complex process of perception, decision-making, and control on its own under an autonomous driving mode, which may require the real-time participation of domain controllers including the intelligent driving domain controller, the chassis domain controller and the vehicle body domain controller, as well as a large number of intra-domain ECUs connected to these domain controllers to ensure the safety of the vehicle during autonomous operation.

Figure 3:
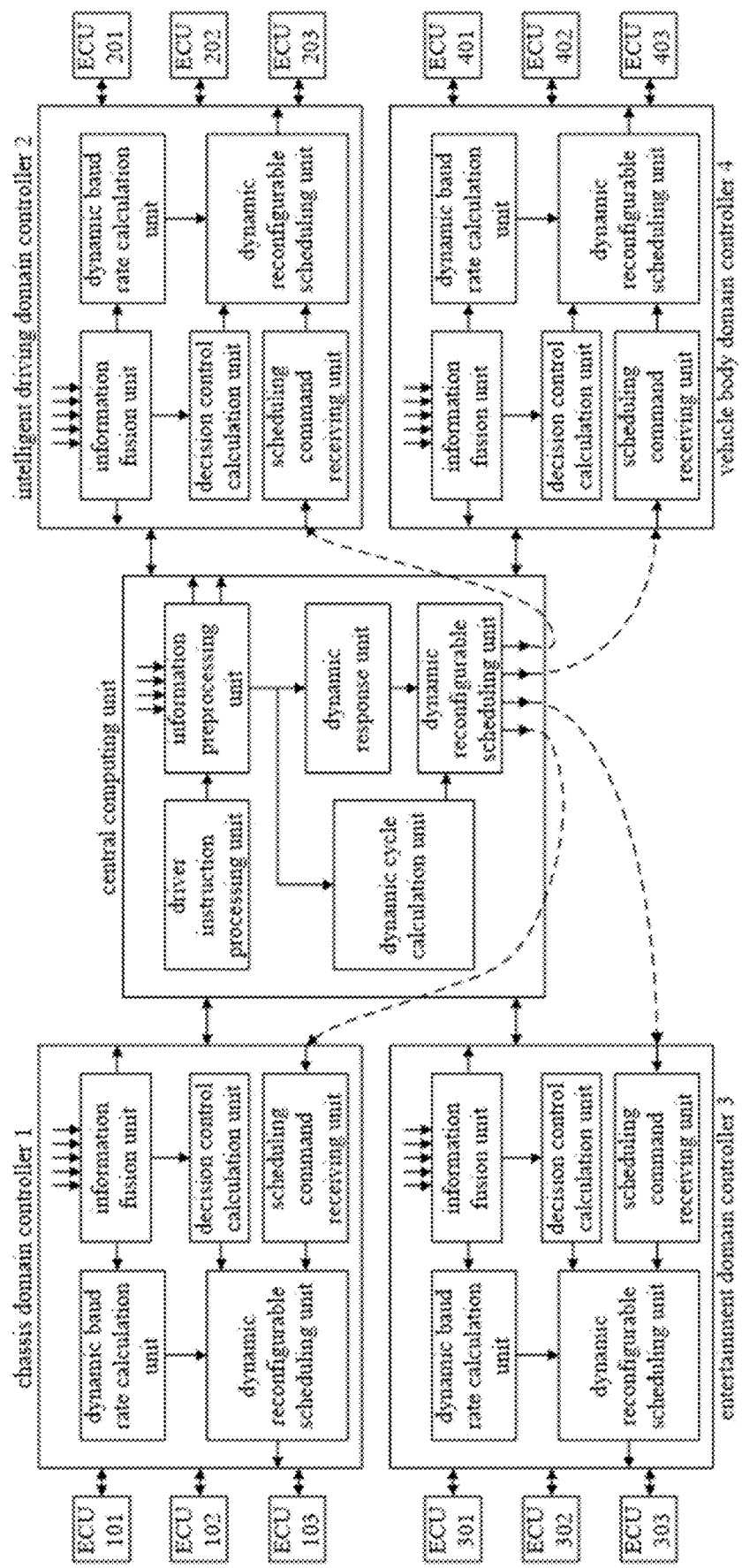
FIG. 3 is a schematically structural diagram of a dynamically reconfigurable network system of an intelligent vehicle according to a second embodiment of the present disclosure.

At the initial moment, the intelligent vehicle may travel autonomously at a nearly constant velocity, with all domain controllers and intra-domain ECUs activated. The vehicle network topology at this time is shown in FIG. 3. In FIG. 3, the central computing unit integrating a driver instruction processing unit, an information preprocessing unit, a dynamic cycle calculation unit, a dynamic response unit and a dynamic reconfigurable scheduling unit may be introduced first. The information preprocessing unit is connected to the driver instruction processing unit, the dynamic cycle calculation unit and the dynamic response unit; and the dynamic reconfigurable scheduling unit is connected to the dynamic cycle calculation unit and the dynamic response unit. The driver instruction processing unit may be configured to receive one or more operation instructions directly from the driver (such as turning on autonomous driving mode or turning off the entertainment device), process the operation instructions and send them to the information preprocessing unit. The information preprocessing unit may be configured to convert information from the driver instruction processing unit and information about vehicle state from an information fusion unit of a domain controller into the same data format, and send the converted data to the dynamic response unit and the dynamic cycle calculation unit. The information preprocessing unit may also be configured to convert information from the information fusion unit of one or some domain controllers into the same data format and send the converted data to the information fusion unit of another or other domain controller to achieve cross domain communication. The dynamic response unit may be configured to receive information from the information preprocessing unit to decide node control information, namely the numbering of the domain controller that needs to be activated or standby and the numbering of the intra-domain ECU that needs to be activated or standby, and send the node control information to the dynamic reconfigurable scheduling unit. The dynamic cycle calculation unit may be configured to receive information from the information preprocessing unit, calculate the basic period $T_{Basic}$ of the reconfigurable network scheduling and the sampling period $T_{sample,i}$ of each domain controller in real time, and send the basic period and the sampling period to the dynamic reconfigurable scheduling unit. The dynamic reconfigurable scheduling unit may be configured to package information from the dynamic response unit and the dynamic cycle calculation unit to form a central scheduling command (i.e. the information about central scheduling instructions mentioned above), and broadcast the command to each domain controller.

The various domain controllers included in the dynamically reconfigurable network system of the intelligent vehicle shown in FIG. 3 may be introduced secondly. At this point, the dynamically reconfigurable network system of the intelligent vehicle may include the chassis domain controller, the entertainment domain controller, the intelligent driving domain controller and the vehicle body domain controller. Each domain controller integrates an information fusion unit, a dynamic baud rate calculation unit, a decision control calculation unit, a scheduling command receiving unit and a dynamic reconfigurable scheduling unit. The information fusion unit is connected to the dynamic baud rate calculation unit and the decision control calculation unit; and the dynamic reconfigurable scheduling unit is connected to the dynamic baud rate calculation unit, the decision control calculation unit and the scheduling command receiving unit. Moreover, the chassis domain controller is connected to ECU 101, ECU 102 and ECU 103 over a network; the intelligent driving domain controller is connected to ECU 201, ECU 202 and ECU 203 over a network; the entertainment domain controller is connected to ECU 301, ECU 302 and ECU 303 over a network; and the vehicle body domain controller is connected to ECU 401, ECU 402 and ECU 403 over a network.

In each domain controller, the scheduling command receiving unit may be configured to receive a central scheduling command from the central computing unit and transfer it to the dynamic reconfigurable scheduling unit; the information fusion unit may be configured to receive information from each ECU in the domain and information from the information preprocessing unit of the central computing unit, integrate and calibrate these information, and send the processed information to the decision control calculation unit, the dynamic baud rate calculation unit and the information preprocessing unit of the central computing unit; the decision control calculation unit may be configured to determine control commands for each ECU in the domain by means of information from the information fusion unit and send the control commands to the dynamic reconfigurable scheduling unit; the dynamic baud rate calculation unit may be configured to calculate the baud rate of sending information from the domain controllers to each ECU in the domain in real time; and the dynamic reconfigurable scheduling unit may be configured to receive and package the control commands from the decision control calculation unit, the baud rate value from the dynamic baud rate calculation unit and the central scheduling command from the scheduling command receiving unit to form an intra-domain comprehensive control command (i.e. the information about intra-domain comprehensive control instructions mentioned above) and broadcast it to each ECU in the domain so that the ECU in the domain makes a response upon the intra-domain comprehensive control command.

After a period of time, a command to turn off the entertainment system may be issued by the driver, then be analyzed by the driver instruction processing unit of the central computing unit, and be sent to the information preprocessing unit. The information preprocessing unit may be configured to convert the information from the driver instruction processing unit and the information about vehicle operating condition from the information fusion unit of a domain controller (such as longitudinal velocity, longitudinal acceleration, transverse velocity, transverse acceleration, steering wheel angle, etc.) into the same data format for further processing by the dynamic cycle calculation unit and the dynamic response unit. Since the vehicle moves in a straight line at an approximately uniform speed and the vehicle status information is relatively stable, the dynamic cycle calculation unit can, based on a formula $T_{Basic}=F$ (v,a,ω,$f_c$,$c_c$) and a formula $T_{sample,i}$=G(v,a,ω,$f_i$,$c_i$,$n_{A,i}$,$n_{T,i}$), calculate the basic period $T_{Basic}$ of the central computing unit and the sampling period $T_{sample,i}$ (i=1, 2, 3, 4) of each domain controller in real time, which may remain basically unchanged, at 60 ms and 20 ms, respectively. The dynamic response unit may be configured to parse the driver command information and the information about vehicle operating condition from the information preprocessing unit, decide the node control information (that is, the node(s) to be standby at present being the entertainment domain controller (numbered 4), and all the intra-domain ECUs in this domain and the node(s) to be activated being null), and send the node control information to the reconfigurable scheduling unit.

Figures 4, 5:
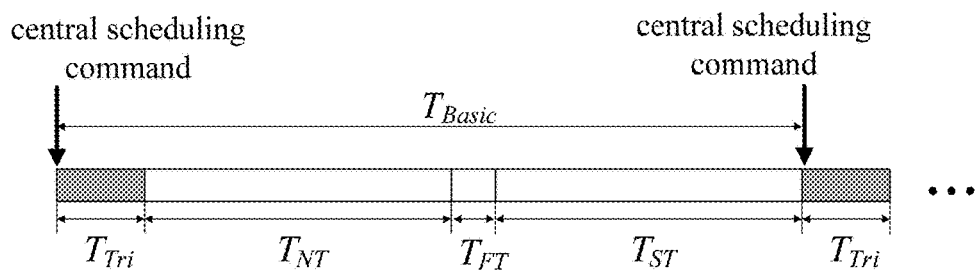
FIG. 4 is a schematically structural diagram of a central scheduling command according to an embodiment of the present disclosure.
FIG. 5 is a schematically structural diagram of a basic period according to an embodiment of the present disclosure.

The reconfigurable scheduling unit may package the numbering $N_{A,3}$ of the standby node, the numbering $N_{S,0}$ of the activated node, and the sampling periods $T_{Sample,1}$, $T_{Sample,2}$, $T_{Sample,3}$ and $T_{Sample,4}$ of each domain controller into an information frame, take a trigger information Tri as a frame header to form a central scheduling command as shown in FIG. 4, and broadcast the formed central scheduling command to the intelligent driving domain controller, the chassis domain controller, the entertainment domain controller and the vehicle body domain controller.

Figure 6:
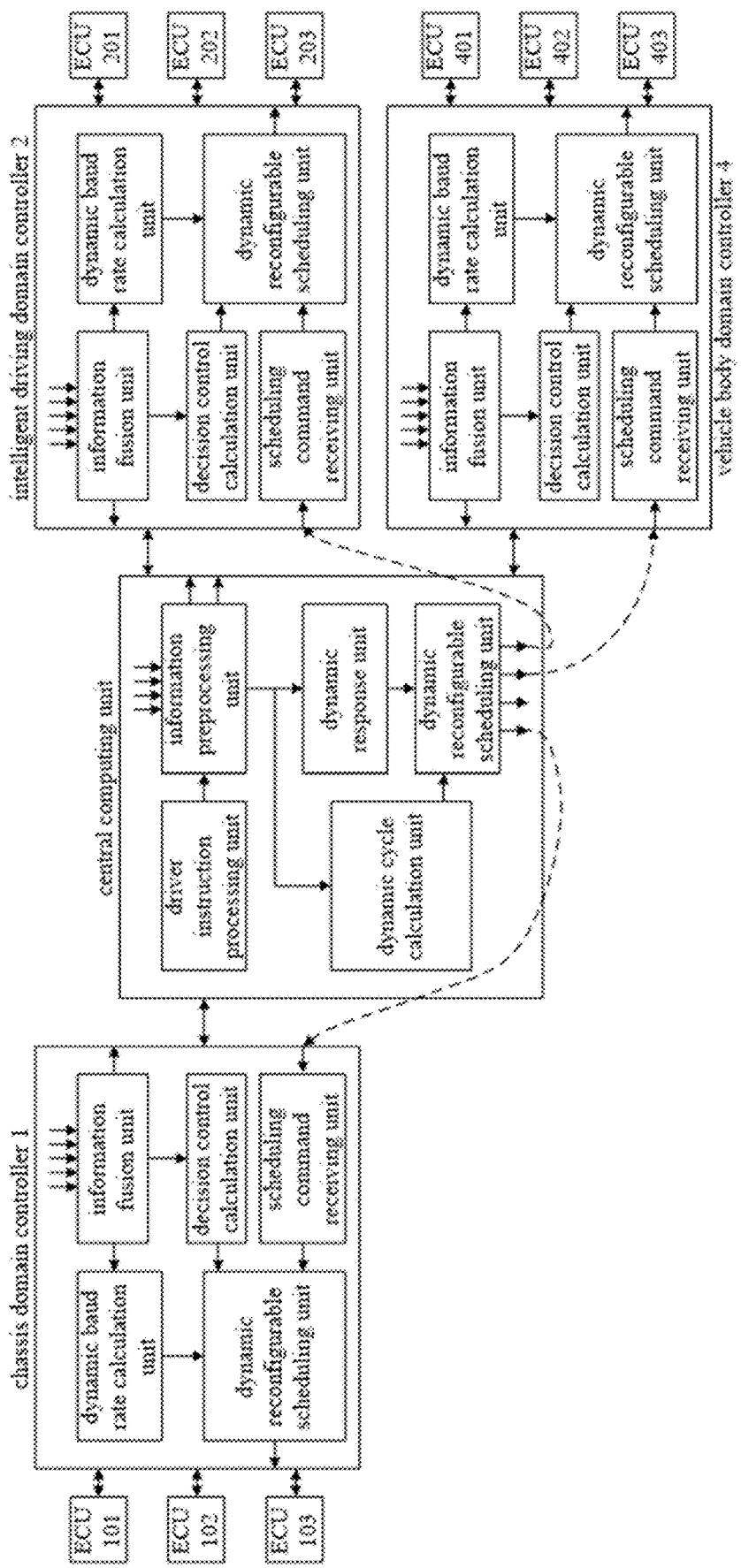
FIG. 6 is a schematically structural diagram of a dynamically reconfigurable network system of an intelligent vehicle according to a third embodiment of the present disclosure.

The basic period $T_{Basic}$ of the reconfigurable network scheduling may be equal to a sending time interval of two adjacent central scheduling commands containing trigger information, and the basic period $T_{Basic}$ may be further divided into a triggering time period $T_{Tri}$, a node control time period TNT, an asynchronous time period $T_{AT}$, an idle time period $T_{FT}$ and a synchronous time period $T_{ST}$, as shown in FIG. 5. During the triggering time period $T_{Tri}$, the scheduling command receiving unit of each domain controller may receive the central scheduling command and read the triggering information within it. Then, during the node control time period TNT, the node control information, namely the numbering $N_{A,3}$ of the standby node and the numbering $N_{S,0}$ of the activated node, may be read and sent to the dynamic reconfigurable scheduling unit. At this point, the dynamic reconfigurable scheduling unit corresponding to the intelligent driving domain controller, the chassis domain controller and the vehicle body domain controller may not respond to the node control information; and the dynamic reconfigurable scheduling unit of the entertainment domain controller may broadcast a standby command to all ECU nodes in the domain to standby all nodes in the domain, then the entertainment domain controller itself may enter the standby state, thus the entire entertainment domain is in the standby state. The vehicle network topology at this time is shown in FIG. 6.

Each domain controller may communicate randomly based on event triggering (such as a battery warning message, a forward collision reminder message, an acceleration or brake pedal position message, a steering wheel angle message, etc.) during the asynchronous time period $T_{AT}$, and may not communicate during the idle time period $T_{FT}$. During the synchronous time period $T_{ST}$, each domain controller may read matched domain controller periodic information in the central scheduling command, and periodically communicate with taking $T_{Sample,1}$=20 ms, $T_{Sample,2}$=20 ms, $T_{Sample,3}$=20 ms and $T_{Sample,4}$=20 ms as the sampling periods (such as velocity information, acceleration information, battery temperature information, motor control command, etc.). Other domain controllers except for the entertainment domain controller may, during the asynchronous time period $T_{AT}$ and the synchronous time period $T_{ST}$, utilize the information fusion unit to receive information from the ECU in each domain and information in the information preprocessing unit of the central computing unit, integrate and calibrate the received information, and send to the decision control calculation unit, the dynamic baud rate calculation unit and the information preprocessing unit of the central computing unit. The decision control calculation unit may utilize the information transmitted by the information fusion unit to calculate control commands for each ECU in the domain (such as driving motor torque, steering motor torque, braking pressure, air conditioning motor torque, lighting voltage, etc.), and then send the control commands to the dynamic reconfigurable scheduling unit. The dynamic baud rate calculation unit may utilize the information transmitted by the information fusion unit to calculate in real-time the baud rate of the domain controller sending information to each ECU in the domain. The current operating condition of the vehicle is relatively stable, and the response speed for each actuator is not high, so the baud rate is maintained at a normal rate at this time. The dynamic reconfigurable scheduling unit may be configured to receive and package the control commands from the decision control calculation unit, the baud rate value of the dynamic baud rate calculation unit and central scheduling commands from the scheduling command receiving unit to form an intra-domain comprehensive control command, and broadcast it to each ECU in the domain, then each intra-domain ECU may respond based on the intra-domain comprehensive control command.

A second example is as follows:

When the intelligent vehicle accelerates and lane changes, the information preprocessing unit of the central computing unit may receive and process the information about vehicle operating condition from the information fusion unit of the domain controller, and send the processed data to the dynamic response unit and the dynamic cycle calculation unit. Due to the acceleration and lane changing of the vehicle at this time, information about the vehicle state changes rapidly. Therefore, the basic period $T_{Basic}$ of the reconfigurable network scheduling and the sampling period $T_{Sample,2}$ of the intelligent driving domain controller calculated by the dynamic cycle calculation unit may correspondingly be decreased, for example $T_{Basic}$ becomes 50 ms, the sampling period $T_{Sample,2}$ of the intelligent driving domain controller becomes 10 ms, and the sampling period of other domain controllers remain at 20 ms. Moreover, the dynamic response unit may parse a command to turn on the car engine from the driver and information about the temperature inside the car sent by the information preprocessing unit, decide that the node to be standby is the air conditioning ECU node in the body domain (such as $N_{A,403}$) and the node to be activated is the car engine ECU node in the entertainment domain (such as $N_{S,301}$), and send the node control information to the reconfigurable scheduling unit.

Figure 8:
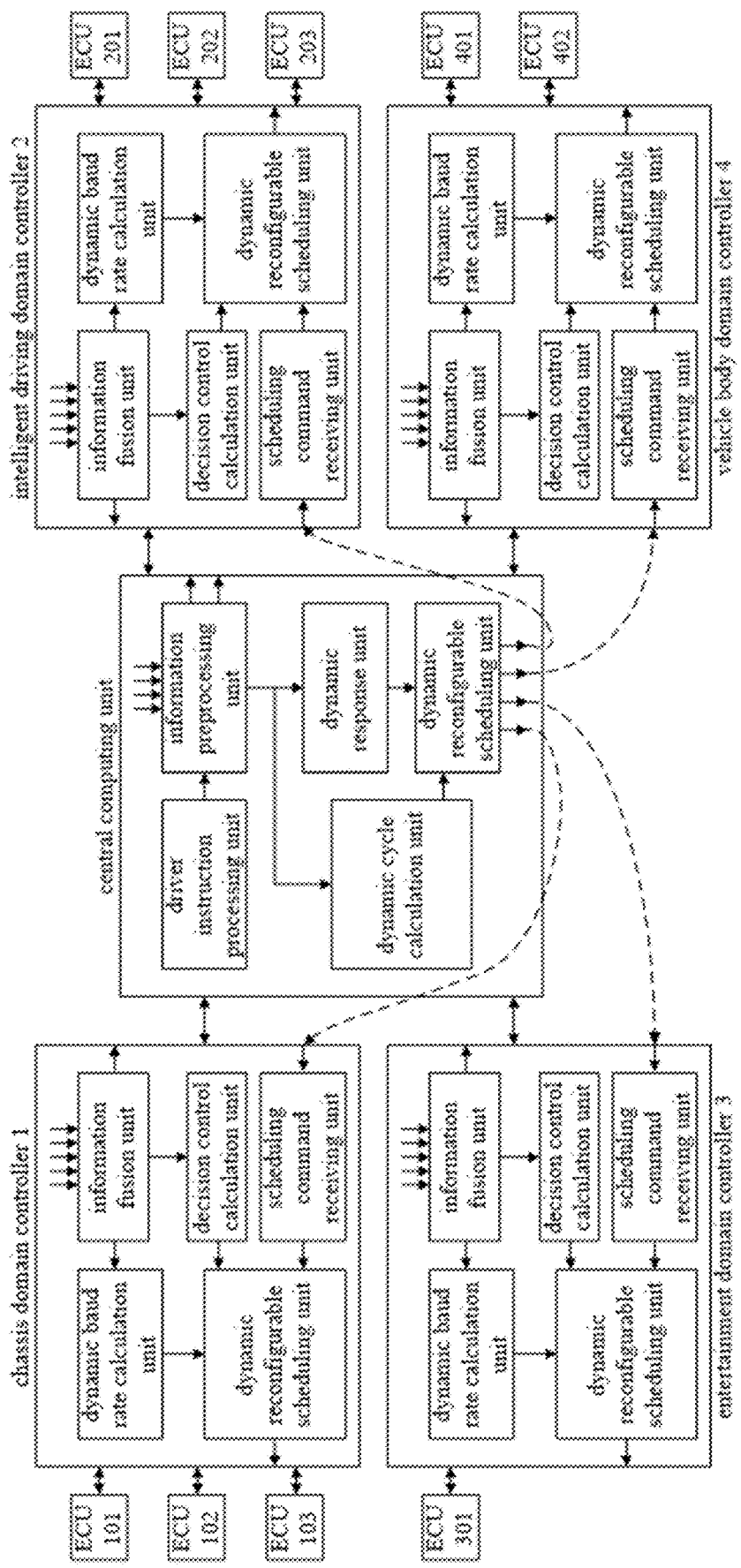
FIG. 8 is a schematically structural diagram of a dynamically reconfigurable network system of an intelligent vehicle according to a fourth embodiment of the present disclosure.

The reconfigurable scheduling unit may package the numbering $N_{A,403}$ of the standby node, the numbering $N_{S,301}$ of the activated node and the sampling periods $T_{Sample,1}$, $T_{Sample,2}$, $T_{Sample,3}$ and $T_{Sample,4}$ of each domain controller into information frame, take a trigger information Tri as a frame header to form a central scheduling command as shown in FIG. 7, and broadcast the formed central scheduling command to the intelligent driving domain controller, the chassis domain controller, the entertainment domain controller and the vehicle body domain controller. During the node control time period TNT, the scheduling command receiving unit of each domain controller may read the node control information, namely the numbering $N_{A,403}$ of the standby node and the numbering $N_{S,301}$ of the activated node, and send it to the dynamic reconfigurable scheduling unit. The intelligent driving domain controller and the dynamic reconfigurable scheduling unit of the chassis domain controller may not respond to the node control information. The dynamic reconfigurable scheduling unit of the entertainment domain controller may turn its operating state into the activated state, and broadcast the activated command to all ECU nodes in its domain; and the car engine $N_{S,301}$ may turn its operating state into the activated state after receiving the activated command, while other nodes in the domain remain in the standby state. The dynamic reconfigurable scheduling unit of the vehicle body domain controller may broadcast a standby command to all ECU nodes in the domain; the air conditioning ECU node $N_{A,403}$ may turn its operating state from the activated state to the standby state after receiving the standby command, and other nodes in the domain remain in the activated state. The vehicle network topology at this time is shown in FIG. 8.

Each domain controller may communicate randomly based on event triggering during the asynchronous time period $T_{AT}$, and may not communicate during the idle time period $T_{FT}$. During the synchronous time period $T_{ST}$, each domain controller may read matched domain controller periodic information in the central scheduling command, and periodically communicate with taking $T_{Sample,1}=10$ ms, $T_{Sample,2}=20$ ms, $T_{Sample,3}=20$ ms and $T_{Sample,4}=20$ ms as the sampling periods. During the asynchronous time period $T_{AT}$ and synchronous time period $T_{ST}$, each domain controller may utilize the information fusion unit to receive information from the ECU in each domain and information in the information preprocessing unit of the central computing unit, integrate and calibrate the received information, and send to the decision control calculation unit, the dynamic baud rate calculation unit and the information preprocessing unit of the central computing unit. The decision control calculation unit may utilize the information transmitted by the information fusion unit to calculate control commands for each ECU in the domain, and then send the control commands to the dynamic reconfigurable scheduling unit. The dynamic baud rate calculation unit may utilize the information transmitted by the information fusion unit to calculate in real-time the baud rate of sending information to each ECU in the domain by the domain controller.

Due to the complex working condition when the vehicle is accelerates and lane changes, the response speeds of the ECUs such as a camera, a radar, a drive motor and a steering motor are required to be high. At this point, the baud rate calculated in real-time by the dynamic baud rate calculation unit in the intelligent driving and chassis domains may increase to improve the real-time performance of intra-domain information, while the baud rate of the entertainment and body domains remains at a normal rate. The dynamic reconfigurable scheduling unit in each domain controller may receive and package control commands from the decision control calculation unit, the baud rate value from the dynamic baud rate calculation unit and the central scheduling command from the scheduling command receiving unit to form an intra-domain comprehensive control command, and broadcast it to each ECU in the domain which makes response to the intra-domain comprehensive control command, thereby completing the acceleration and lane changing process of the intelligent vehicle.

With the dynamically reconfigurable network system and the network scheduling method for an intelligent vehicle provided in an embodiment of the present disclosure, by means of dynamically activating or placing network nodes in the network system on standby based on a driver's wishes and the vehicle's running condition, the vehicle network topology is changed in real time, thus preventing the waste of network resources caused by invalid information transmission from a source, thereby increasing the utilization rate of the network resources. Furthermore, the nodes in the activated state in the network system change dynamically, causing the amount of data transmitted in the network system to also dynamically change. With the network scheduling method disclosed herein, according to the running condition of the vehicle and the transmission situation of network information in the network system, a basic period of the reconfigurable network scheduling, a sampling period of the domain controllers and the baud rate of intra-domain information transmission are dynamically changed, thereby achieving the real-time performance of network messages and high utilization of network bandwidth under all operating conditions of the intelligent vehicle.

Furthermore, corresponding to the network scheduling method provided in the above embodiments, an intelligent vehicle may also be provided. The intelligent vehicle may include: the dynamically reconfigurable network system of an intelligent vehicle according to the above embodiments, a memory for storing a program, a processor for executing the program stored in the memory to implement all steps of the network scheduling method according to the embodiments of the present disclosure.

In addition, corresponding to the network scheduling method provided in the above embodiments, a computer-readable storage medium provided may store a program which is executed by a processor to implement the network scheduling method according to the embodiments of the present disclosure.

It is understood by those skilled in the art that all or part of the functions of various methods in the above embodiments may be implemented either by means of hardware or by means of computer programs. When all or part of the functions in the above embodiments are implemented through a computer program, the program may be stored in a computer-readable storage medium, which may include read-only memory, random access memory, magnetic disk, optical disk, hard disk, etc., and the program is executed by a computer to achieve the above functions. For example, when a program is stored in the memory of a device, all or part of the above functions can be achieved when the program in the memory is executed by the processor. In addition, when all or part of the functions in the above embodiments are implemented by means of a computer program, the program may also be stored in a storage medium such as a server, another computer, a disk, a compact disc, a flash drive or a portable hard drive, downloaded or copied to the memory of the local device, or the system of the local device is updated. When the program in the memory is executed through the processor, all or part of the functions in the above embodiments can be realized by a processor.

The present disclosure has been described above with reference to the above specific embodiments, which are merely provided for the purpose of understanding and are not intended to limit the present disclosure. It will be possible for those skilled in the art to make simple deductions, deformations, or substitutions based on the principle of the present disclosure.

The invention claimed is:

1. A dynamically reconfigurable network system of an intelligent vehicle, comprising:
    a central computing unit,
    a chassis domain controller for controlling a chassis system of the vehicle, an entertainment domain controller for controlling a multimedia entertainment system of the vehicle, an intelligent driving domain controller for controlling an automatic driving system of the vehicle, and a vehicle body domain controller for controlling a vehicle body electronic system of the vehicle;

wherein, the central computing unit is coupled to the chassis domain controller, the entertainment domain controller, the intelligent driving domain controller and the vehicle body domain controller respectively through a network, the chassis domain controller, the entertainment domain controller, the intelligent driving domain controller and the vehicle body domain controller each comprises a plurality of intra-domain electronic control units (ECUs) and each connects to the plurality of intra-domain ECUs through a network;

the central computing unit is configured to obtain information about driver operating instructions and information about vehicle operating condition, determine information about central scheduling instructions based on the information about driver operating instructions and the information about vehicle operating condition, and transmit the information about central scheduling instructions to the chassis domain controller, the entertainment domain controller, the intelligent driving domain controller and the vehicle body domain controller, wherein the information about central scheduling instructions comprises: domain controller triggering information, node control information involving a domain controller that needs to be activated or standby and/or an ECU that needs to be activated or standby, and domain controller periodic information; wherein the domain controller triggering information comprises a basic period for planning network scheduling of the intelligent vehicle, the basic period includes a triggering time period, a node control time period, an asynchronous time period, an idle time period and a synchronous time period;

wherein determining information about the central scheduling instructions based on the information about driver operating instructions and the information about vehicle operating condition comprises:

determining the domain controller triggering information based on a velocity, acceleration and yaw angular velocity of the vehicle and network traffic and network capacity entering and exiting the central computing unit during a previous basic period;

determining the node control information based on the information about driver operating instructions and a predetermined node control rule;

determining the domain controller periodic information corresponding to the chassis domain controller, the entertainment domain controller, the intelligent driving domain controller and the vehicle body domain controller, respectively, based on the velocity, acceleration and yaw angular velocity of the vehicle, the network traffic and the network capacity entering and exiting the central computing unit during a previous basic period, and the numbers of event triggering information and periodic information entering and exiting the chassis domain controller, the entertainment domain controller, the intelligent driving domain controller and the vehicle body domain controller during a previous sampling period; and obtaining the information about central scheduling instructions by packaging the domain controller triggering information, the node control information, and the domain controller periodic information of each domain controller;

the chassis domain controller, the entertainment domain controller, the intelligent driving domain controller and the vehicle body domain controller are configured to receive and parse the information about central scheduling instructions, and update an operating state of their own domain controller and an operating state of each connected intra-domain ECU based on the node control information, the operating state includes an activated state and a standby state;

the chassis domain controller, the entertainment domain controller, the intelligent driving domain controller, or the vehicle body domain controller in the activated state are configured to determine information about intra-domain comprehensive control instructions based on the domain controller periodic information, the information about vehicle operating condition and information about state of electronic and electrical components connected with each intra-domain ECU, and transmit the information about intra-domain comprehensive control instructions to each connected intra-domain ECU, wherein the information about intra-domain comprehensive control instructions comprises the information about central scheduling instructions, a baud rate value of sending information to each intra-domain ECU, and a control instruction for each intra-domain ECU; and each intra-domain ECU in the activated state is configured to receive the information about intra-domain comprehensive control instructions, and control the connected electronic and electrical components based on the information about intra-domain comprehensive control instructions.

2. A network scheduling method applied to the dynamically reconfigurable network system of an intelligent vehicle according to claim 1, comprising:

the central computing unit obtaining the information about driver operating instructions and the information about vehicle operating condition, determining information about the central scheduling instructions based on the information about driver operating instructions and the information about vehicle operating condition, and transmitting the information about central scheduling instructions to the chassis domain controller, the entertainment domain controller, the intelligent driving domain controller and the vehicle body domain controller, wherein the information about central scheduling instructions includes: domain controller triggering information, node control information involving a domain controller that needs to be activated or standby and/or an intra-domain ECU that needs to be activated or standby, and domain controller periodic information; wherein the domain controller triggering information comprises a basic period for planning network scheduling of the intelligent vehicle, the basic period includes a triggering time period, a node control time period, an asynchronous time period, an idle time period and a synchronous time period;

wherein determining information about the central scheduling instructions based on the information about driver operating instructions and the information about vehicle operating condition comprises:

determining the domain controller triggering information based on a velocity, acceleration and yaw angular velocity of the vehicle and network traffic and network capacity entering and exiting the central computing unit during a previous basic period;

determining the node control information based on the information about driver operating instructions and a predetermined node control rule;

determining the domain controller periodic information corresponding to the chassis domain controller, the entertainment domain controller, the intelligent driving domain controller and the vehicle body domain controller, respectively, based on the velocity, acceleration and yaw angular velocity of the vehicle, the network traffic and the network capacity entering and exiting the central computing unit during a previous basic period, and the numbers of event triggering information and periodic information entering and exiting the chassis domain controller, the entertainment domain controller, the intelligent driving domain controller and the vehicle body domain controller during a previous sampling period; and obtaining the information about central scheduling instructions by packaging the domain controller triggering information, the node control information, and the domain controller periodic information of each domain controller;

the chassis domain controller, the entertainment domain controller, the intelligent driving domain controller and the vehicle body domain controller receiving and parsing the information about central scheduling instructions, updating the operating state of their own domain controllers and the operating state of each connected intra-domain ECU based on the node control information, the operating state including the activated state and the standby state;

the chassis domain controller, the entertainment domain controller, the intelligent driving domain controller or the vehicle body domain controller in the activated state determining the information about intra-domain comprehensive control instructions based on the domain controller periodic information, the information about vehicle operating condition and the information about state of electronic and electrical components connected with each intra-domain ECU, and transmitting the information about intra-domain comprehensive control instructions to each connected intra-domain ECU, wherein the information about intra-domain comprehensive control instructions includes the information about central scheduling instructions, the baud rate value of sending information to each intra-domain ECU, and the control instruction for each intra-domain ECU; and each intra-domain ECU in the activated state receiving the information about intra-domain comprehensive control instructions, and controlling the connected electronic and electrical components based on the information about intra-domain comprehensive control instructions.

3. The method according to claim 2, wherein
the chassis domain controller, the entertainment domain controller, the intelligent driving domain controller and the vehicle body domain controller read their respective corresponding domain controller periodic information during the triggering time period, randomly communicate based on event triggering during the asynchronous time period, perform no communication during the idle time period, and periodically communicate with each connected intra-domain controller ECU based on their respective domain controller periodic information during the synchronous time period.

4. The method according to claim 2, wherein the chassis domain controller, the entertainment domain controller, the intelligent driving domain controller or the vehicle body domain controller in the activated state determining the information about intra-domain comprehensive control instructions based on the domain controller periodic information, the information about vehicle operating condition and the information about state of electronic and electrical components connected with each intra-domain ECU comprises:

based on the numbers of event triggering information and periodic information entering and exiting the chassis domain controller, the entertainment domain controller, the intelligent driving domain controller and the vehicle body domain controller during a previous sampling period and the domain controller periodic information respectively corresponding to the chassis domain controller, the entertainment domain controller, the intelligent driving domain controller and the vehicle body domain controller, obtaining baud rate values of sending information by the chassis domain controller, the entertainment domain controller, the intelligent driving domain controller and the vehicle body domain controller to their respective connected intra-domain ECU;

the chassis domain controller, the entertainment domain controller, the intelligent driving domain controller or the vehicle body domain controller in the activated state, during respective corresponding sampling periods of their domain controllers, obtaining information about state of electronic and electrical components connected with each intra-domain ECU, and, based on the information about state of electronic and electrical components connected with each intra-domain ECU and the information about vehicle operating condition, determining control instruction for each connected intra-domain ECU; and packaging the information about central scheduling instructions, the baud rate value of sending information to each connected intra-domain ECU, and the control instruction for each connected intra-domain ECU to obtain the information about intra-domain comprehensive control instructions.

5. The method according to claim 2, wherein transmitting the information about central scheduling instructions to the chassis domain controller, the entertainment domain controller, the intelligent driving domain controller and the vehicle body domain controller comprises:

broadcasting the information about central scheduling instructions to the chassis domain controller, the entertainment domain controller, the intelligent driving domain controller and the vehicle body domain controller.

6. The method according to claim 2, wherein transmitting the information about intra-domain comprehensive control instructions to each connected intra-domain ECU comprises:

broadcasting the information about intra-domain comprehensive control instructions to each connected intra-domain ECU.

7. The method according to claim 2, wherein when the node control information involves a domain controller that needs to be standby, updating an operating state of their own domain controller and an operating state of each connected intra-domain ECU based on the node control information comprises:

updating the operating state of a domain controller that needs to be standby and that of each intra-domain ECU connected to the domain controller that needs to be standby to the standby state.

8. An intelligent vehicle, comprising:

a dynamically reconfigurable network system comprising:
- a central computing unit,
- a chassis domain controller for controlling a chassis system of the vehicle,
- an entertainment domain controller for controlling a multimedia entertainment system of the vehicle,
- an intelligent driving domain controller for controlling an automatic driving system of the vehicle, and
- a vehicle body domain controller for controlling a vehicle body electronic system of the vehicle;
- wherein, the central computing unit is coupled to the chassis domain controller, the entertainment domain controller, the intelligent driving domain controller and the vehicle body domain controller respectively through a network,
- the chassis domain controller, the entertainment domain controller, the intelligent driving domain controller and the vehicle body domain controller each comprises a plurality of intra-domain electronic control units (ECUs) and each connects to the plurality of intra-domain ECUs through a network;

a memory for storing a program; and a processor for executing the program stored in the memory to implement the method according to claim 2.

\* \* \* \* \*